Oct. 3, 1961 O. S. WELSH 3,002,729

TUBE WITH EXTERNAL FINS

Filed June 20, 1955

INVENTOR.
ORAL S. WELSH

BY Bosworth, Sessions, Herrstrom & Lawler

ATTORNEYS 3,002,729

TUBE WITH EXTERNAL FINS

Oral S. Welsh, Elyria, Ohio, assignor to Brown Fintube Company, Elyria, Ohio, a corporation of Ohio Filed June 20, 1955, Ser. No. 516,364
1 Claim. (Cl. 257—262.19)

This invention relates to heat exchange tubes with external fins. More particularly, the invention relates to heat exchange tubes with separately formed longitudinally extending fins that are preferably bonded to the outer surfaces of the tubes by means of a bonding metal that is fused in the bonding operation. This type of bonding is hereinafter referred to as brazing, and the term "brazing" as used herein is intended to cover bonding methods ordinarily known as soldering, silver soldering, brazing, copper brazing, hydrogen brazing, and the like.

The general object of the invention is the provision of improved heat exchange tubes having separately formed longitudinally extending external fins. More specific objects include the provision of heat exchange tubes in which the longitudinally extending external fins are made up of separately formed members which are so constituted as to space themselves accurately around the exterior of the tube by engagement with each other; the provision of such tubes in which the base portions of the separately formed fin members are brazed to the outer surface of the tube to provide metallic paths of relatively large cross-sectional area for the flow of heat between the fin members and the tube; the provision of such tubes wherein the fin portions of adjacent fin members may be brazed to each other if desired; and the provision of tubes having separately formed external fins and separately formed internal fins brazed to the tube.

Heat exchange tubes with longitudinally extending external fins are desirable for many purposes and are widely used. Heretofore, however, the manufacture of such tubes in which the separately formed fin members are brazed to the exterior of the tubes has required rather expensive equipment, particularly where it is desired to maintain accurate spacing of the fin members circumferentially of the tube. Some methods of manufacturing such tubes have required special jigs or fixtures to hold the fin members in place during the brazing operation. Other methods have utilized spacing members to position the fin members with respect to each other. According to the present invention, efficient finned tubes can be produced at reasonable cost without requiring special jigs, fixtures, or spacing members by providing a construction in which open channel section fin members are disposed around the exterior of the tube and are proportioned with respect to the circumference of the tube in such manner that the channel section members engage each other and thus accurately space the flange or portions of the channel members circumferentially of the tube. With this arrangement, it is only necessary to hold the fins on the tube by means of appropriate clamps or a wrapping during the brazing operation without requiring any special jigs, fixtures, spacers, or the like.

According to applicant's invention, the tube is produced by providing a plurality of open channel section fin members, each fin member having a pair of fin portions and a base portion which is curved transversely to conform to the exterior surface of the tube. The fin members are so dimensioned that the total width of the members at or adjacent the base portions thereof is substantially equal to the outer circumference of the tube to which they are to be secured. Thus, a group of fin members can be assembled in the form of a ring around the outer surface of the tube, with the base portions of the fin members engaging the outer surface of the tube and the fin portions of adjacent fin members engaging each other. The fin members are held in this position by appropriate clamps or a wrapping, and then subjected to the brazing operation. Preferably, the flanges or fin portions of adjacent members are also arranged so that they resiliently engage each other when the members are held against the tube.

Referring to the drawings, FIGURE 1 is an isometric view showing a preferred form of externally finned tube made according to my invention.

Figure 1:
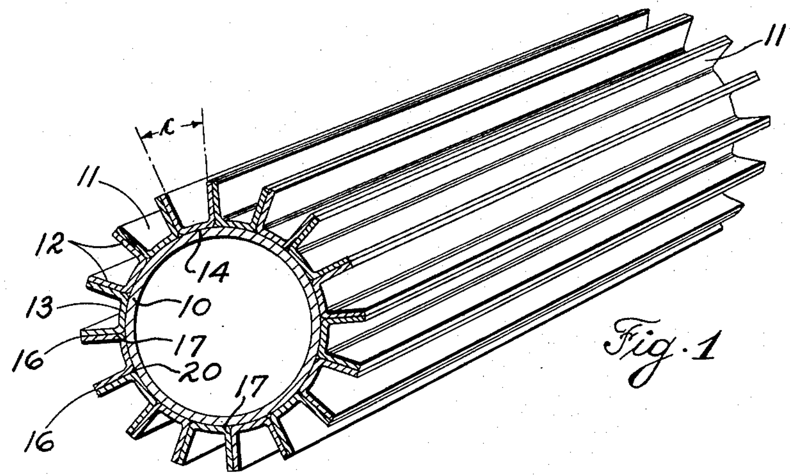
Figure 3:
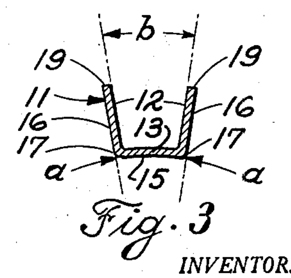
FIGURE 3 is a transverse sectional view of one of the fin members.

Referring to FIGURES 1 and 3 of the drawings, a heat exchange tube embodying my invention may comprise a tube 10, to the exterior of which a plurality of open channel section fin members 11 are secured. Each fin member comprises a pair of fin portions 12 and a base portion 13. The base portions of the fin members preferably are brazed to the outer surface 14 of the tube 10 and preferably are arcuate in shape, so that the outer surfaces 15 of the base portions substantially conform to the outer surface of the tube. The fin members extend generally longitudinally of the tube, and the outer surfaces 16 of the fin portions 12 of adjacent fin members engage each other as indicated in FIGURE 1 and are preferably brazed together. Thus, each pair of engaging fin portions of adjacent fin members together constitute a single fin extending longitudinally of the tube and extending outwardly generally radially from the surface of the tube. Tubes of this character are particularly useful where it is necessary to have fluids flow longitudinally over the exterior surface of the tubes.

As shown in FIGURE 1, the base portions 13 are of such width that when the required number of fin members are assembled together in the form of a ring on the exterior of the tube, the outer edges 17 of the base portions of adjacent fin members 11 contact each other; thus, the fin members act as spacers for each other, insuring accurate circumferential spacing of the fins constituted by the contacting fin portions 12 of adjacent members.

The proper dimensions of the fin members can be determined simply by making the total width of the base portions of the fin members substantially equal to the outer circumference of the tube. For example, if the fin members are all of the same width, the arc indicated at *a—a* in FIGURE 3 is made substantially equal to the outer circumference of the tube divided by the number of fin members to be positioned on the tube. Inasmuch as the spacing of the fin members is determined by the members themselves, the accuracy of the spacing is as great as the accuracy of the fin members; and so long as the fin members are held firmly against the exterior surface of the tube, they must remain accurately in position. Thus, it is only necessary to hold the fin members firmly against the outer surface of the tube during the brazing operation.

Preferably, the outer surfaces 16 of fin portions 12 of adjacent fin members are brazed together to form a single fin. In order to assure firm contact and proper brazing action, even though there may be slight dimensional variations in the fin members and the tube, the fin members are preferably produced by a rolling operation which is carried out so that the angle *b* between the fin portions of each fin member is initially very slightly greater than the angle *c* between the fin portions of each fin member in the completed tube. When the fin members are so constructed, the fin portions must be deflected toward each other slightly when the fin members are assembled and held against the external surface of the tube; therefore, the fin portions of adjacent fin members must resiliently engage each other, thus assuring proper contact for the brazing operation.

In making the tubes, the fin members are preferably produced by rolling to the desired dimensions as outlined above and a group of the required number of fin members is assembled about the tube with the fin members in contact with and properly spacing each other. The fin members are then held firmly against the tube, and the brazing operation is carried out.

Figure 2:
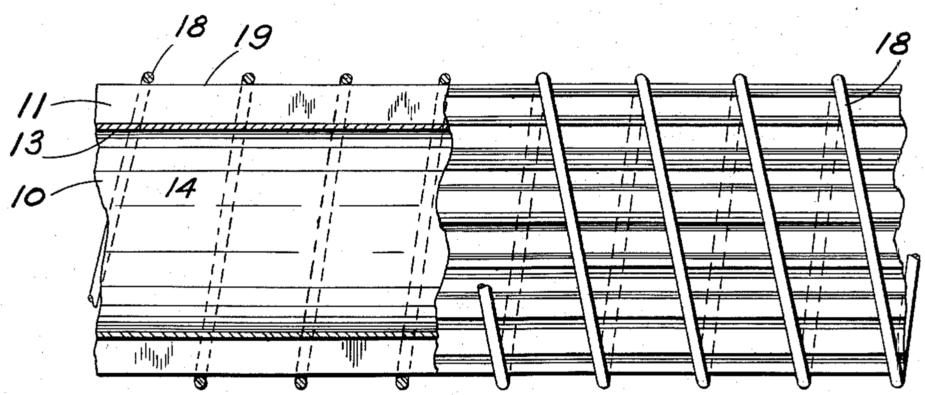
FIGURE 2 is a longitudinal view, partially in section, illustrating one step in the manufacture of the tube of FIGURE 1.

The fin members may be held against the tube by means such as the coil spring or the like disclosed and claimed in the co-pending application of John W. Brown, Jr., and Arvid C. K. Nihlen, Serial No. 488,672, filed February 16, 1955, now Patent No. 2,936,517 granted May 15, 1960, and assigned to the assignee of the present application, or by appropriate clamps. Also, as indicated in FIGURE 2, the fin members 11 may be held with their base portions 13 firmly in contact with the exterior surface 14 of the tube 10 by means of a wire cable, or the like, 18 wrapped around the assembly and engaging the outer edges 19 of the fin members. The wrapping is applied under tension, and the turns are spaced closely enough to urge the base portions 13 of the fin members firmly into contact with the outer surface 14 of the tube. In doing this, the fin portions 12 of adjacent fin members are brought firmly into contact with each other, and accurate spacing of the fin members is maintained because the spacing is determined by the width *a—a* of the base portions of the fin members.

Inasmuch as the fin members are secured firmly in position, the brazing operation may be carried out readily. When ferrous tubes and fin members are employed, copper brazing gives excellent results. To carry out the copper brazing, the surfaces of the tube and fins are cleaned prior to assembly, and copper is applied to the contacting surfaces of the parts. This can be done, for example, by copper plating the fin members or the tube or both; by supplying metallic copper in the form of paste or powder to the surfaces to be joined; or by inserting copper wires in the spaces 20 that are left between the base portions of adjacent fin members immediately adjacent the exterior surface of the tube. The copper brazing operation is carried out in the usual manner by heating the temperature of the assembly to the required degree in the usual reducing atmosphere.

For non-ferrous tubes, silver soldering or brazing operations are preferred. Such operations can be carried out by tinning the outer surface of the base portions and fin portions of the fin members with solder, supplying flux to the surfaces and assembling the members with the tube. The assembly is then brought to brazing temperature and permitted to cool. The heating can be accomplished, for example, by inserting the entire assembly in an appropriate furnace, by heating the tube progressively by means of a torch or an electric heating element on the inside of the tube, by means of a ring burner on the exterior of the tube, or by induction heating or the like.

Regardless of the particular method employed, the brazing operation presents no serious problem, because the fin members are held firmly in place and space each other accurately. The bases of the fin members conform substantially to the tube, and good bonds between the fin members and the tube and between the contacting outer surfaces of the fin portions of adjacent fin members are obtained regardless of reasonable dimensional variations in the fin members and the tube.

Figure 4:
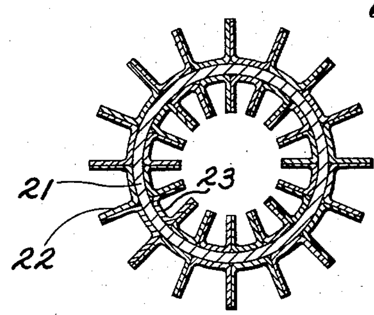
FIGURE 4 illustrates a modified form of tube having both internal and external fins.

It will be evident that various types of fin members and combinations of fin members can be employed so long as the fin members act to space themselves properly on the exterior of the tube. Different widths of fin members with different depths of fin portions can be employed on the same tube for special purposes. Also, as shown in FIGURE 4, the present invention is adapted to the production of tubes with internal and external fins. Here the tube 21 has a plurality of fin members 22 brazed to the exterior thereof as described above and has a plurality of fin members 23 brazed to the interior thereof according to the invention of my co-pending application Serial No. 511,840, filed May 31, 1955, now Patent No. 2,930,405 granted March 29, 1960. In producing a tube such as shown in FIGURE 4, the external fin members 22 are held on the tube as described above, while the internal fin members support themselves within the tube as described in my aforesaid application. The brazing operation is carried out by supplying brazing metal to the contacting parts as described above with respect to the outer fin members 22 and, as described in my aforesaid application, by substantially the same method with respect to the inner fin members 23. A single heating operation carried out by any convenient method, such as one of the methods described above, then serves to braze both the internal and the external fins to the tube, completing in one operation an extremely efficient heat exchange tube.

While it is preferred to braze the fin members to the tube and to each other, for some purposes brazing of the fin members to the tube only may be sufficient and in some instances, it may be desirable to construct the fin members so that they only contact each other adjacent the base portions thereof, thus doubling the number of fins produced by a given number of fin members.

The preferred tubes are highly efficient from a heat exchange standpoint because of the relatively large area of metallic bond between the fin members and the tube that provides adequate paths for the transfer of the heat between the fins and the tube itself and because of the accuracy with which the fin members are spaced. The invention adapts itself to the production of a wide variety of tubes and can be carried out economically because all of the fin members are simultaneously brazed to the tube without the need for any complicated tools, jigs, fixtures, or spacing members. Since the spacing is accomplished by the fin members themselves, it is almost impossible for them to become displaced during the brazing operation. Accordingly, the brazing operation can be carried out readily without the exercise of any unusual degree of care.

Those skilled in the art will appreciate that further changes and modifications can be made in the invention without departing from the spirit and scope thereof. The essential characteristics of the invention are defined in the appended claim.

I claim:

A heat exchange tube comprising a tube having a plurality of separately formed longitudinally extending open channel section fin members brazed to the exterior thereof throughout the entire circumference thereof, each fin member having a base portion substantially conforming to the exterior surface of the tube and brazed thereto and a pair of separate fin portions extending outwardly from the edges of the base portion, the fin members being positioned on the exterior of the tube with the entire outer surfaces of both the fin portions of each fin member in contact with and brazed to an entire outer surface of a fin portion of an adjacent fin member.

References Cited in the file of this patent

UNITED STATES PATENTS

| | | |
|---|---|---|
| 1,721,808 | Kettering | July 23, 1929 |
| 2,298,250 | Brown | Oct. 6, 1942 |
| 2,316,273 | Meyer et al. | Apr. 13, 1943 |
| 2,342,117 | Brown et al. | Feb. 22, 1944 |